(12) United States Patent
Bogle et al.

(10) Patent No.: US 9,334,121 B2
(45) Date of Patent: May 10, 2016

(54) SELF-STACKING SPIRAL MODULAR PLASTIC CONVEYOR BELT

(71) Applicant: Laitram, L.L.C., Harahan, LA (US)

(72) Inventors: David W. Bogle, Round Rock, TX (US); Alejandro J. Talbott, Marrero, LA (US); Robert L. Rosen, New Orleans, LA (US)

(73) Assignee: Laitram, L.L.C., Harahan, LA (US)

( * ) Notice: Subject to any disclaimer, the term of this patent is extended or adjusted under 35 U.S.C. 154(b) by 37 days.

(21) Appl. No.: 13/942,080

(22) Filed: Jul. 15, 2013

(65) Prior Publication Data

US 2014/0021020 A1 Jan. 23, 2014

Related U.S. Application Data

(60) Provisional application No. 61/673,019, filed on Jul. 18, 2012.

(51) Int. Cl.
| | |
|---|---|
| *B65G 21/18* | (2006.01) |
| *B65G 15/30* | (2006.01) |
| *B65G 33/02* | (2006.01) |
| *B65G 17/08* | (2006.01) |
| *B65G 15/42* | (2006.01) |
| *B65G 17/40* | (2006.01) |

(52) U.S. Cl.
CPC ............... *B65G 15/30* (2013.01); *B65G 15/42* (2013.01); *B65G 17/08* (2013.01); *B65G 17/086* (2013.01); *B65G 17/40* (2013.01); *B65G 33/02* (2013.01)

(58) Field of Classification Search
CPC ........................... B65G 2207/24; B65G 21/18
USPC .......................................................... 198/778
See application file for complete search history.

(56) References Cited

U.S. PATENT DOCUMENTS

| | | | | |
|---|---|---|---|---|
| 3,938,651 | A * | 2/1976 | Alfred et al. | 198/778 |
| 4,603,776 | A * | 8/1986 | Olsson | 198/728 |
| 4,840,269 | A | 6/1989 | Anderson | |
| 4,858,750 | A * | 8/1989 | Cawley | 198/778 |
| 5,350,056 | A * | 9/1994 | Hager | 198/778 |
| 6,695,128 | B2 | 2/2004 | Palmaer et al. | |
| 7,258,226 | B2 | 8/2007 | Nelson et al. | |
| 7,270,231 | B2 * | 9/2007 | Heber | 198/778 |

(Continued)

FOREIGN PATENT DOCUMENTS

WO     2007107022 A1     9/2007

OTHER PUBLICATIONS

International Search Report and Written Opinion of the International Searching Authority, PCT/US2013/050508, mailed Feb. 21, 2014, European Patent Office, Rijswijk, NL.

(Continued)

*Primary Examiner* — James R Bidwell
(74) *Attorney, Agent, or Firm* — Catherine M. Bishop

(57) ABSTRACT

A modular spiral belt constructed of a series of hingedly interconnected belt modules arranged in a helical stack. The modular spiral belt includes outer side plates that include openings for airflow and inner side plates that are solid to block airflow. The openings may include valves for selectively opening and closing the openings. A locking mechanism may lock two tiers together. A hold down may apply pressure to prevent destacking of the belt, or a guide may be disposed with the helical stack for preventing destacking.

27 Claims, 15 Drawing Sheets

(56) References Cited

U.S. PATENT DOCUMENTS

| | | | |
|---|---|---|---|
| 8,348,046 B1 * | 1/2013 | Baumgardner | B65G 45/24 |
| | | | 198/495 |
| 2004/0020749 A1 * | 2/2004 | Wood et al. | 198/778 |
| 2011/0247355 A1 | 10/2011 | McCormick et al. | |
| 2013/0020177 A1 | 1/2013 | Baumgardner et al. | |
| 2013/0270073 A1 | 10/2013 | Gramby | |
| 2013/0270074 A1 | 10/2013 | Malmberg et al. | |

OTHER PUBLICATIONS

Partial International Search Report of the International Searching Authority (Invitation to Pay Additional Fees and, Where Applicable, Protest Fee—Annex to Form PCT/ISA/206 Communication Relating to the Results of the Partial International Search), PCT/US2013/050508, mailed Sep. 24, 2013, European Patent Office, Rijswijk, NL.

* cited by examiner

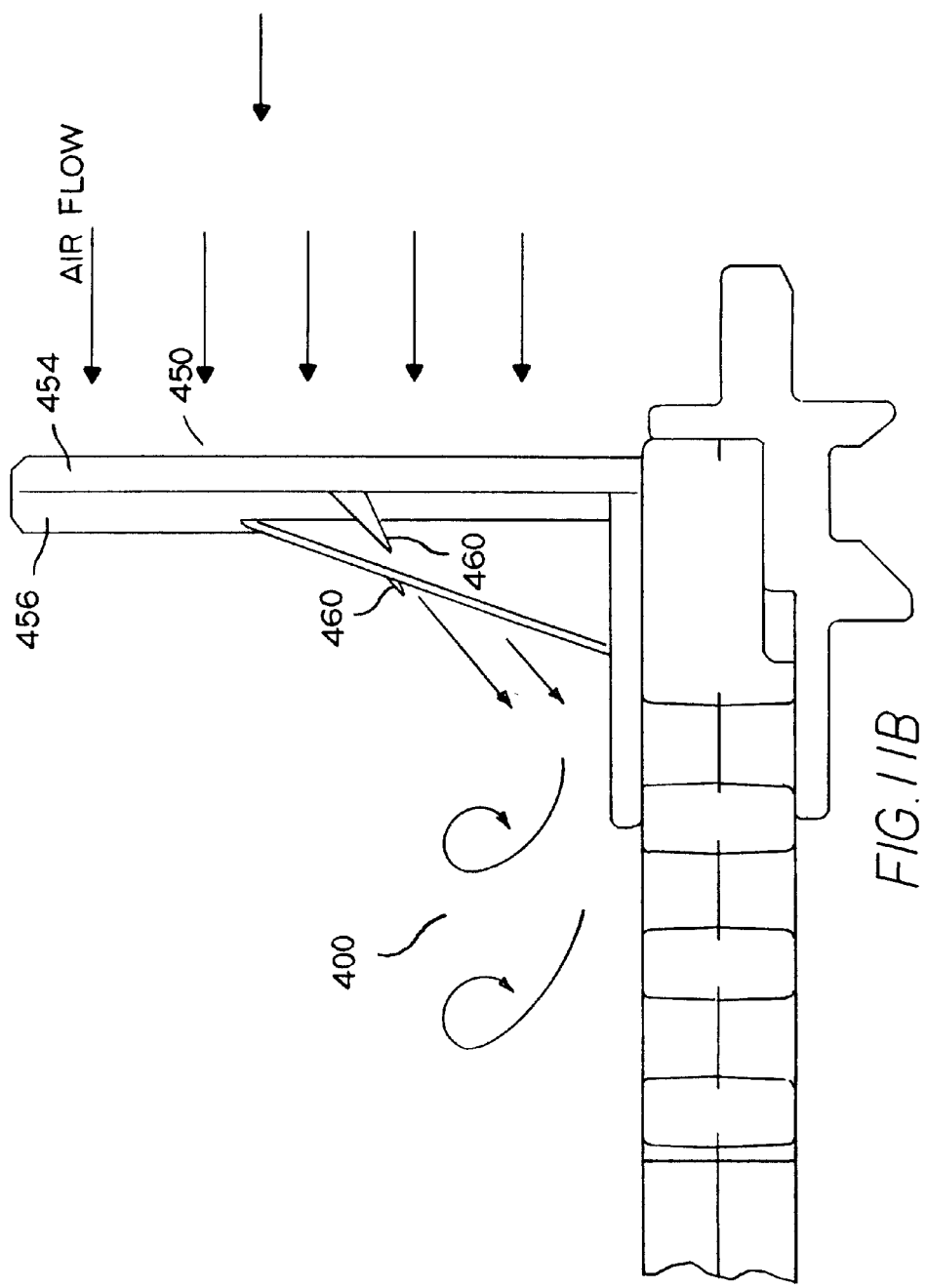

SELF-STACKING SPIRAL MODULAR PLASTIC CONVEYOR BELT

BACKGROUND OF THE INVENTION

The invention relates generally to power-driven conveyors and, more particularly, to modular plastic conveyor belts suitable for following curved paths.

Conveyor belts are typically used for conveying bulk material, such as foodstuffs or other materials, that must be transported through a cooled or refrigerated environment. Typical conveyor belts have the advantage that relatively little energy is required for transporting the bulk material across horizontal surfaces. The conveyance of bulk material, however, is limited by such systems to horizontal routes or to routes with only relatively small inclines. To overcome greater heights or inclines, it is necessary to transfer the bulk material to another conveyor system, for example, a bucket chain conveyor. In the transport of material to be refrigerated, it is often desirable to maximize the time of transport within the cooled environment. It is desirable to provide a conveyor belt system that transports goods along an extended path.

Spiral conveyor belts, in which a conveyor belt follows a helical path, are used in certain applications because they allow for an extended path with minimal floor space. For example, spiral conveyor belts are often used in freezers and ovens to provide a long conveying path with a small footprint.

Self-stacking spiral belts are used to form a helical path with minimal framing. A self-stacking conveyor belt uses side plates or side guards coupled to the side edges of the conveyor belt to form a self-supporting stack. The belt travels in a straight path until it enters a spiral or helical configuration. When aligned in the helical configuration, the lower tier of the belt is supported by a frame or drive system, while the upper tiers are supported by the lower tiers. The interface between adjacent tiers is designed to keep the belt supported and laterally aligned. The tiers are laterally aligned by resting the upper edge of a lower side guard against the bottom side edge of the belt in a tier above.

In large spiral freezers, there are generally two different types of airflow used to cool product. The first is vertical airflow. In vertical airflow, air is forced from either the ceiling or the floor through the belting and out the opposite end (floor or ceiling). The air is forced through all the tiers of belting and product to produce convective airflow over the product. Another type of airflow used to cool product is horizontal airflow. In horizontal airflow, air enters from one side of the spiral and exits out of the other side so that the air flows horizontally across the belt.

Many self-stacking spiral belts on the market today prevent adequate horizontal airflow.

In freezer applications, or other applications in which the temperature varies widely or quickly, the tiers tend to push out of alignment, causing the belt to destack.

SUMMARY OF THE INVENTION

A spiral conveyor belt transports articles along a substantially helical path. One version of a spiral conveyor belt embodying features of the invention comprises outer side plates that include openings for airflow and inner side plates that are solid to block airflow. The spiral conveyor belt comprises a series of rows of belt modules hingedly connected together. Each row comprises one or more belt modules. An inner side plate is connected to an inside edge of at least some or all of the rows, and an outer side plates is connected to an outside edge of at least some or all of the rows. The inner side plate is solid, while the outer side plate includes at least one opening to allow air to flow therethrough. The opening may include a valve for selectively opening and closing the opening. An air foil member may induce turbulence in the air flowing through the opening to enhance cooling.

According to one aspect of the invention, a conveyor belt module comprises a central portion extending longitudinally from a first end to a second end, laterally from a first side edge to a second side edge and in thickness from a top surface to a bottom surface, a first side plate coupled to the first side edge and a second side plate coupled to the second side edge. The second side plate is different from the first side plate.

According to another aspect of the invention, a conveyor belt module comprises a central portion, a side plate coupled to the first side edge, the side plate having a body and at least one airflow openings formed in the body, and a valve for selectively opening and closing the airflow opening.

According to another aspect of the invention, a spiral conveyor belt comprises a plurality of modules hingedly connected together forming a helix, a plurality of solid side plates coupled to an interior portion of the helix and a plurality of open side plates coupled to an exterior portion of the helix.

According to still another aspect of the invention, a conveyor belt comprises a plurality of rows of modules hinged connected together. Each row includes a solid side plate and an open side plate having at least one opening to allow air to flow therethrough. According to another aspect of the invention, a set of side plates for a conveyor belt comprises a first side plate configured to couple to a first side edge of the conveyor belt and a second side plate configured to couple to a second side edge of the conveyor belt. The second side plate is different from the first side plate.

According to still another aspect of the invention, a conveyor belt module comprises a central portion extending longitudinally from a first end to a second end, laterally from a first side edge to a second side edge and in thickness from a top surface to a bottom surface, a first side plate coupled to the first side edge, a second side plate coupled to the second side edge and a locking mechanism for locking the first side plate to a first side edge of a corresponding conveyor belt module.

In another embodiment, a spiral conveyor belt comprises a plurality of modules hingedly connected together forming a helix having a top tier, a bottom tier and at least one intermediate tier, a plurality of first side plates coupled to an interior portion of the helix, a plurality of second side plates coupled to an exterior portion of the helix and a hold down for pressing down on the top tier.

According to yet another aspect of the invention, a spiral conveyor comprises a self-stacking conveyor belt having a plurality of modules with side plates hingedly connected together to form a helix having a plurality of tiers. The side plates of a first tier contact and support a second tier above the first tier. A guide disposed within the helix prevents destacking of the conveyor belt, and includes a bottom taper for guiding the conveyor belt onto the guide.

BRIEF DESCRIPTION OF THE DRAWINGS

These features and aspects of the invention, as well as its advantages, are better understood by referring to the following description, appended claims, and accompanying drawings, in which:

FIG. 11B is a front view of the conveyor belt of FIG. 11A.

DETAILED DESCRIPTION OF THE INVENTION

Figure 1:
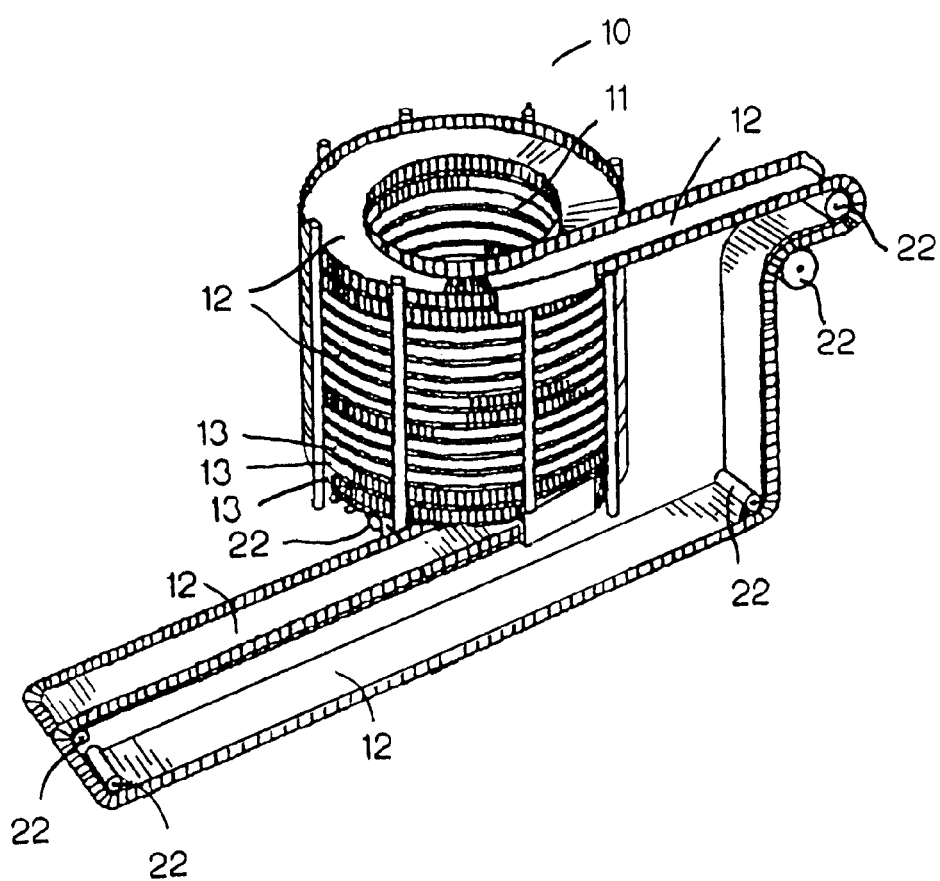
FIG. 1 is a schematic view of a spiral conveyor belt system according to an embodiment of the present invention.

A self-stacking spiral conveyor belt system including side plates configured to facilitate airflow is shown schematically in FIG. 1. The spiral belt conveyor 10 conveys articles vertically along a substantially helical path. The spiral belt conveyor includes a conveyor belt 12 arranged in a helical stack 11, comprising tiers 13 of the belt stacked serially and directly on one another. The belt travels around various take-up, idle, and feed sprockets 22 as it makes it way from the exit at the top of the stack back to the entrance at the bottom. Alternatively, the belt may enter at the top and exit at the bottom of the stack. The spiral belt conveyor 10 may be used within a refrigerator, cooler, for example, providing the articles being conveyed with an extended route for cooling, or with a heating system for baking or heating products.

Figure 2:
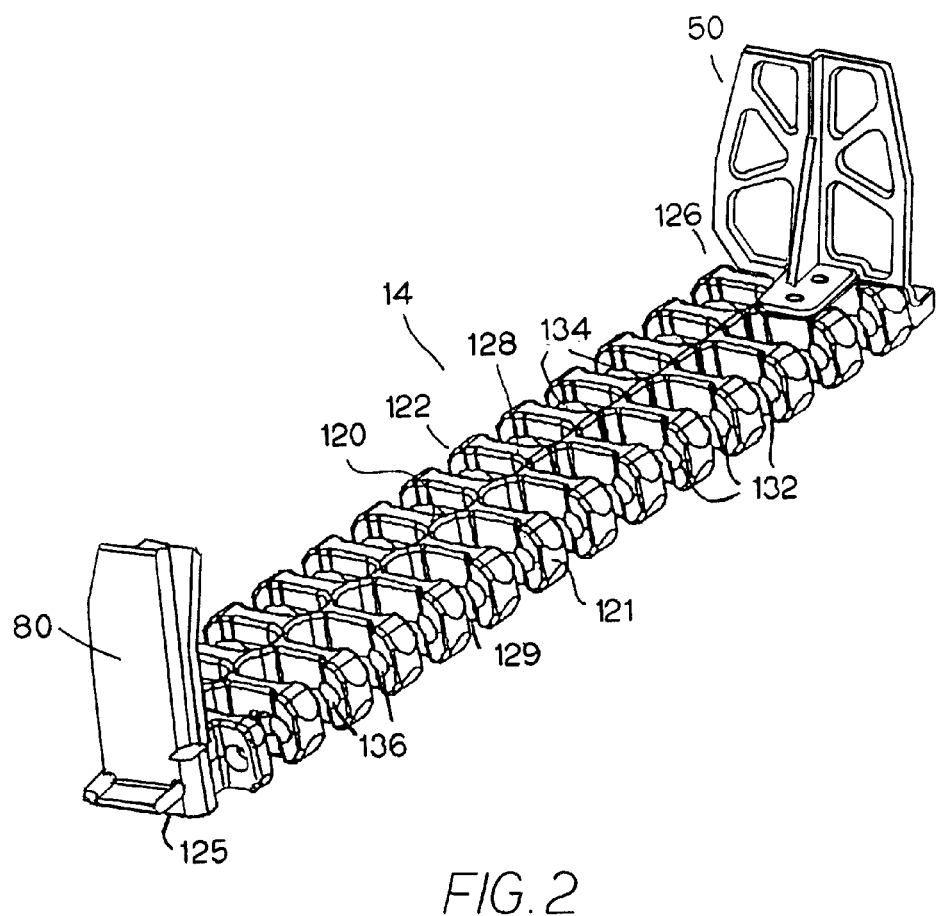
FIG. 2 illustrates a module including side plates for a spiral conveyor belt according to an embodiment of the present invention.

The illustrative conveyor belt 12 is constructed of a series of rows, each comprising one or more belt modules 14, like the belt module of FIG. 2. A row may comprise a single module spanning the width of the belt or a number of side-by-side modules. The illustrative belt module 14 includes a central portion 120 that extends longitudinally in a direction of belt travel from a first end 121 to a second end 122, laterally from an inner edge 125 to an outer edge 126 and in thickness from a top side 128 to a bottom side 129. A first set 132 of hinge elements is formed along the first end 121 of the module; a second set 134, along the second end 122. Rod openings 136 in the hinge elements align to form lateral passageways through the first and second sets of hinge elements. The passageways admit a hinge rod (not shown) that connects a row of similar side-by-side modules to an adjacent row of modules into a conveyor belt. The first set of hinge elements 132 along a row of modules interleaves with the second set of hinge elements 134 of a longitudinally adjacent row to form a hinge with the hinge rod. The rod openings 136 through one or both of the leading and trailing hinge elements may be elongated in the direction of belt travel to allow the belt to collapse at the inside of a turn, while the outside edge expands.

The belt modules 14 are preferably injection molded out of a thermoplastic material, such as polyethylene, polypropylene, acetal, nylon, or a composite resin.

The belt modules may have any suitable configuration and are not limited to the illustrative embodiment.

Side plates 50, 80 are coupled to each side edge of the conveyor belt row. In the illustrative embodiment, a single module 14 spans an entire row, with side plates 50, 80 connected to each side of the module. Alternatively, a row of the conveyor belt may comprise a plurality of modules arranged side-by-side, with an inner side plate 80 coupled to the inner side edge 125 of an inner module and an outer side plate 50 coupled to the outer side edge 126 of an outer module. The side plates may be integrally formed with the module, or may be coupled to the module using screws, bolts, ultrasonic welding, a snap-fit connection or other suitable fastening means. The side plates facilitate stacking of the belt in the helical configuration, as each module rests on a side plate on a lower tier, as shown in FIGS. 3-6. Each side plate may releasable engage a portion of the conveyor belt above it and/or below it. Alternatively, a frame may be used to configure the helix, with the side plates providing additional support or airflow direction.

To facilitate airflow around product conveyed by the belt, each row of the conveyor belt includes two different side plates: an inner side plate 80 and an outer side plate 50. In the illustrative embodiment, the inner side plate 80 and outer side plate 50 are differently configured from each other to facilitate airflow around the product conveyed on the belt 12. As shown, the outer side plate 50 includes openings for airflow, while the inner side plate 80 is substantially solid, directing airflow along the path of the conveyor belt. The inner side plate 80 is also smaller than the outer side plate 50 in the direction of belt travel.

The use of two different side plates facilitates the directing of airflow across the surface of the belt and a product conveyed by the belt to maximize heating or cooling of the product.

Figure 3:
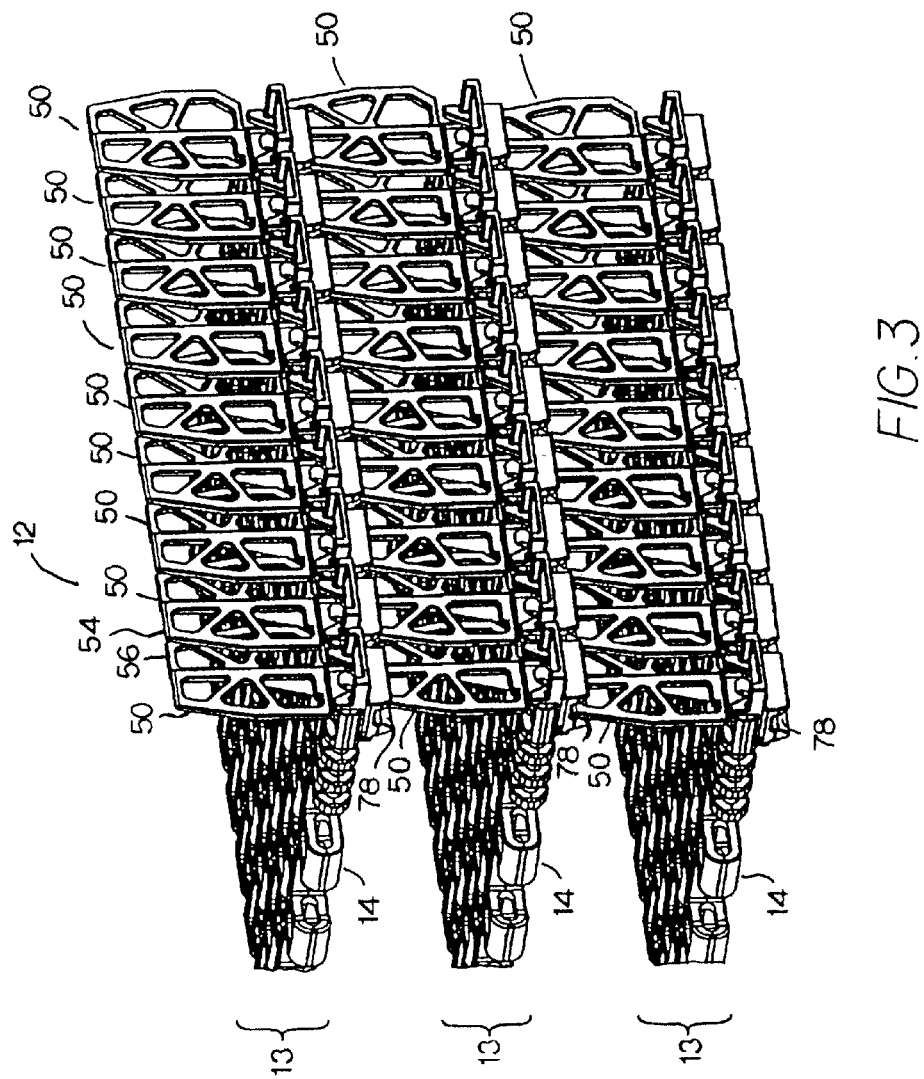
FIG. 3 is an outside view of an outer portion of the spiral conveyor belt of FIG. 1.
Figure 4:
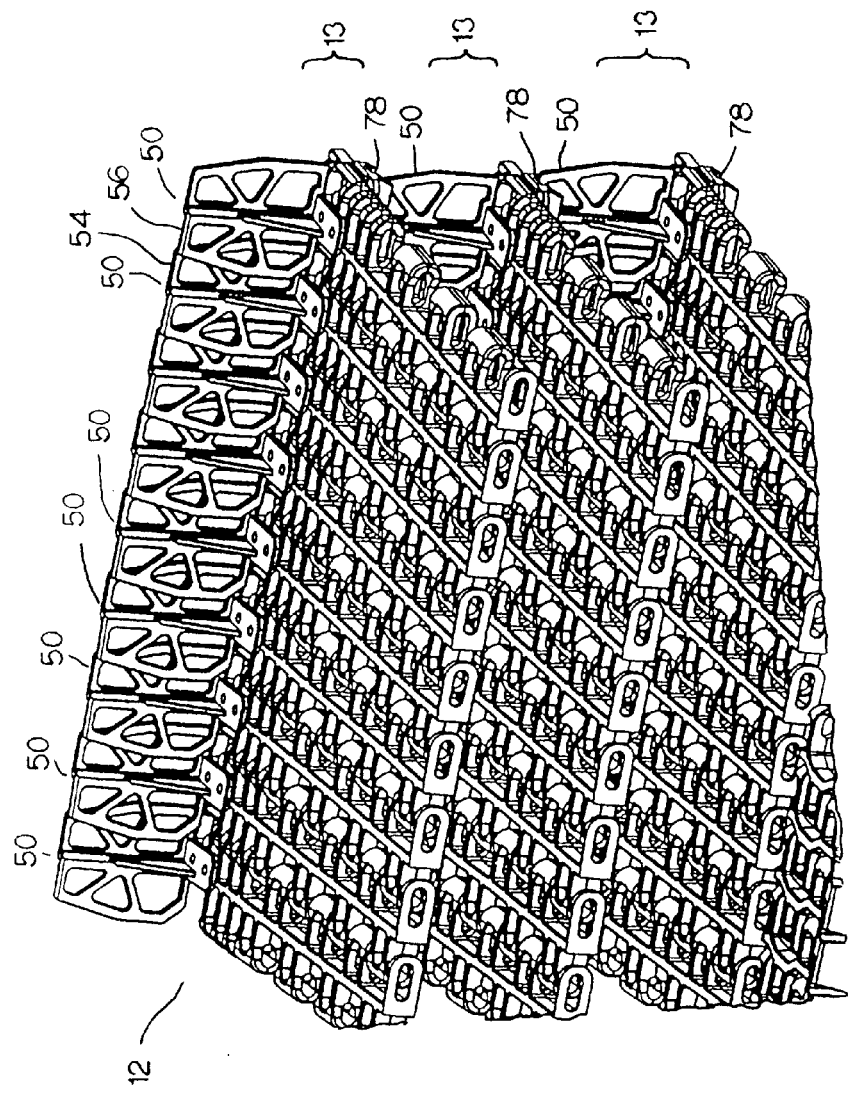
FIG. 4 is an inside view of the outer portion of FIG. 3.
Figure 7A:
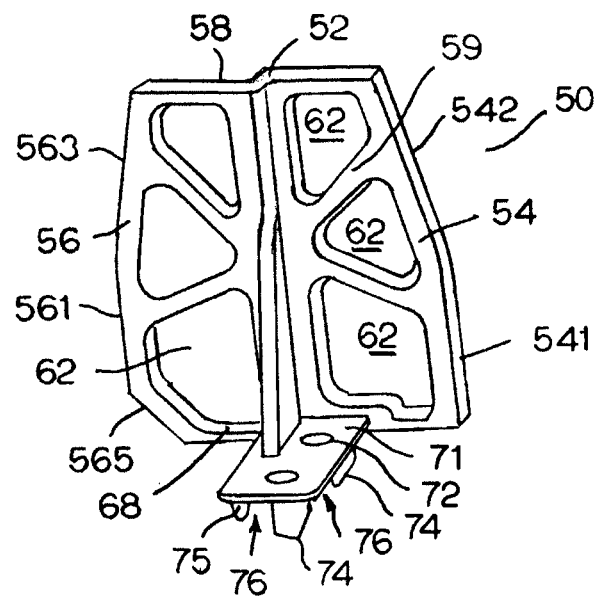
FIG. 7A is an inside view of an outer side plate suitable for coupling to a conveyor belt module.
Figure 7B:
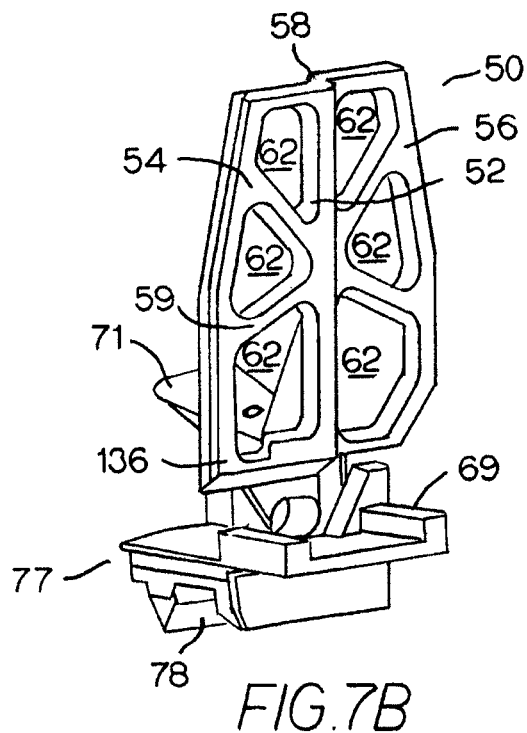
FIG. 7B is an outer view of the outer side plate of FIG. 7A.

Referring to FIGS. 7A and 7B, the illustrative open side plate 50 includes a central spine 52 extending upwards and two planar portions 54, 56 extending on either side of the spine 52 along the side edge. The lead planar portion 54 is offset from the lag planar portion 56, so that the top bar 58 (formed by the top edge of the planar portions 54 and 56 and the rib 52) of the side plate 50 is jagged. The lead planar portion 54 is displaced outward of the lag planar portion 56 in the illustrative embodiment. The planar portions are staggered or offset in the lateral direction so that the lead planar portion 54 of a lagging side plate overlaps with the lag side plate 56 portion of an immediately forward outer side plate, as shown in FIGS. 3-4.

Each planar portion 54 and 56 includes openings 62. The illustrative openings are separated by transverse beams 59 in the planar portions, but the openings may have any suitable size, shape and configuration. The openings may be configured to promote airflow and/or break up laminar airflow.

The lead planar portion includes a lower lead edge 541 that is straight and an angled edge 542 that angles towards the spine 52. The lag planar portion includes a straight middle lag edge 561 and an angled top portion 563 that angles towards the spine 52. The lag planar portion further includes a chamfered bottom edge 565.

The outer side plate 50 further includes a fastening mechanism for securing the side plate to the outer edge of a module. The illustrative fastening mechanism includes a base 71, including openings 72 for screws or another type of fastener. Projections 74 below the base extend the screw openings 72 and, with another projection 75, form channels 76 for receiving edges of a module to mount the side plate to the module. One or more of the base projections 74, 75 may fit into an opening or recess in the upper surface of the module. The illustrative side plate further includes a support 68 extending between the base 71 and the spine 52.

The side plate fastening mechanism further includes a bottom fastener 77, shown in FIG. 7B, that couples to the bottom surface of the module and receives the screws to fasten the side plate 50 to the module. The bottom fastener 77 forms a longitudinally-extending bottom channel 78 for receiving a top edge 58 of an outer side plate on a lower tier, as shown in FIGS. 3-4. The bottom channel 78 includes angled side walls that taper inwards for guiding the lower side plate into the channel 78. The bottom fastener 77 further includes an outside projection 69 for engaging a drive chain driving the spiral conveyor belt 12.

The bottom fastener 77 may be integrally molded with the module, or a separate piece that is attached to the module 14 through any suitable means known in the art. In one embodiment, the bottom fastener 77 is integrally formed with the module and the upper portion of the outer side plate is coupled through a fastening mechanism.

Figure 5:
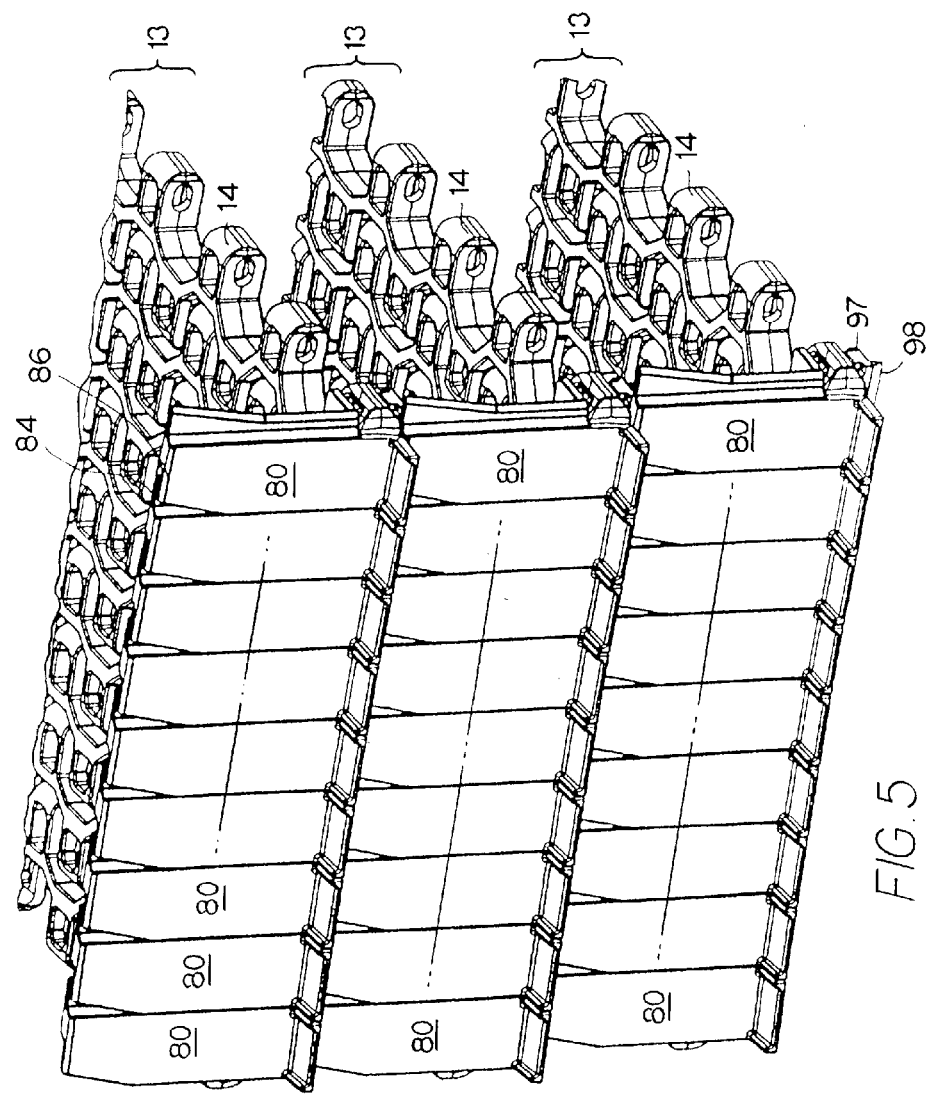
FIG. 5 is an outside view of an inner portion of the spiral conveyor belt of FIG. 1.
Figure 6:
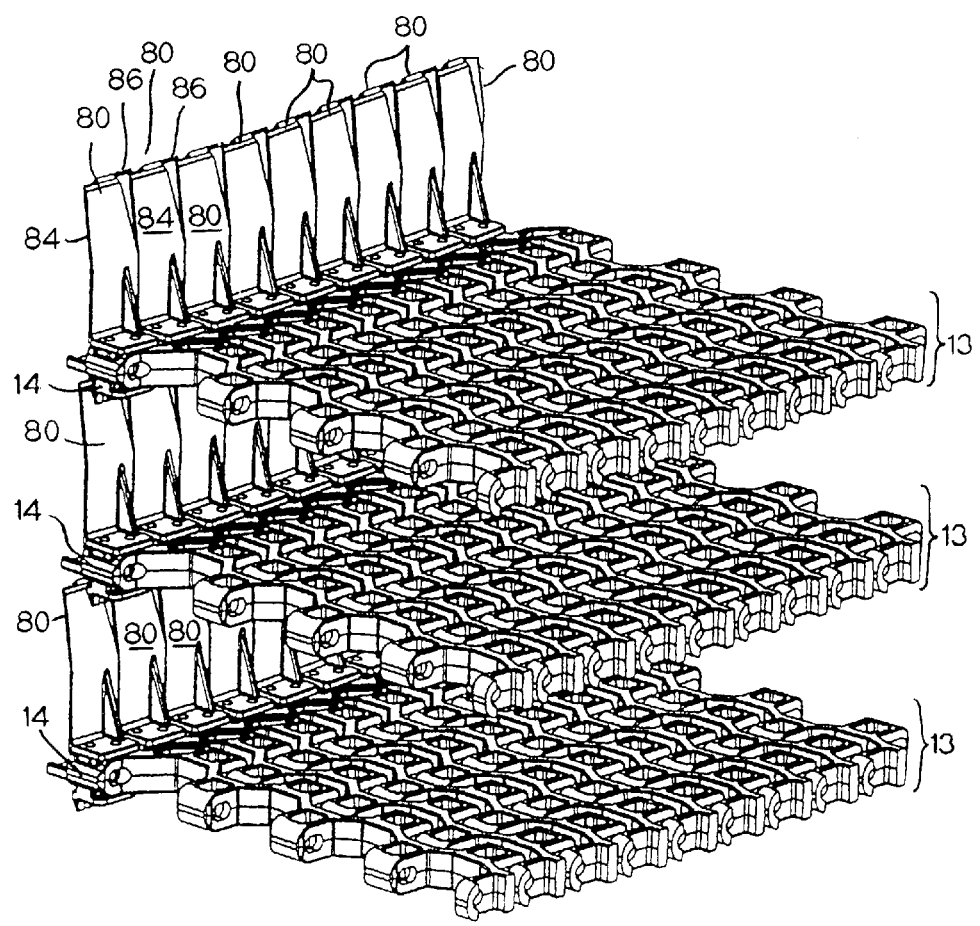
FIG. 6 is an inner view of the inner portion of FIG. 5.
Figure 8A:
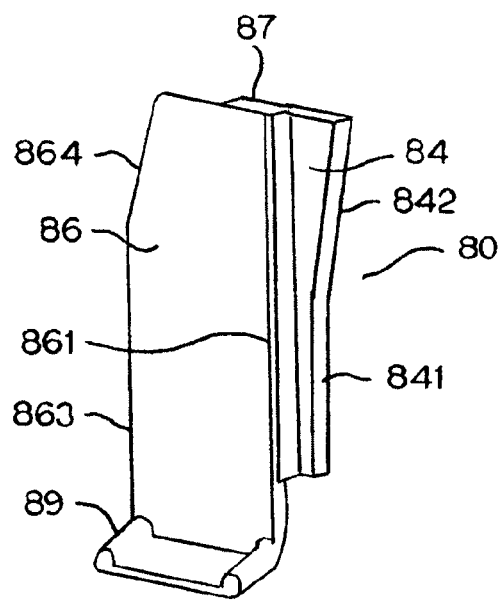
FIG. 8A is an outer view of an inner side plate suitable for coupling to a conveyor belt module.
Figure 8B:
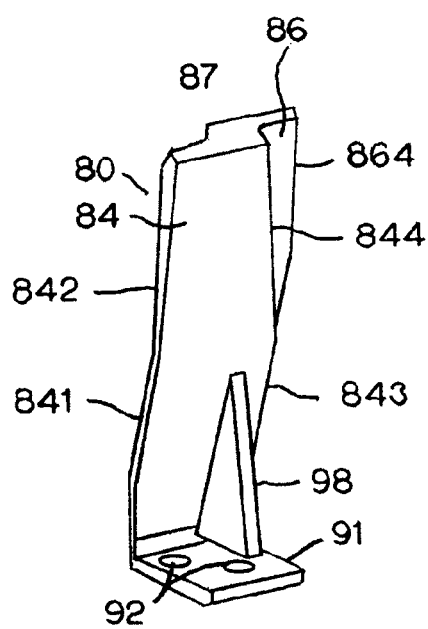
FIG. 8B is an inner view of the inner side plate of FIG. 8A.

FIGS. 8A and 8B illustrate an embodiment of a solid side plate 80 suitable for use in a self-stacking spiral conveyor belt. The illustrative solid side plate 80 comprises two parallel, overlapping solid planar portions 84, 86, which overlap to create a central spine 87. The opposed planar portions 84, 86 extend forwardly and rearwardly from the spine 87 along the direction of travel of the conveyor belt. The planar portions are staggered or offset in the lateral direction so that the lead planar portion 84 of a first side plate overlaps with the lag side plate 86 portion of an immediately forward inner side plate, as shown in FIGS. 5-6.

The lead planar portion 84, which is inset from the lag planar portion 86, includes a lower lead edge 841 that is straight and an upper lead edge 842 that is angled forward, away from the spine 87. The lead planar portion 84 further includes a lower lag edge 843 that is straight and an upper lag edge 844 that is angled. The upper lag edge 844 may be non-parallel with the upper lead edge 842, so that the top of the lead planar portion 84 tapers slightly inwards.

The lag planar portion 86 includes a straight lead edge 861. The lag planar portion further includes a lower lag edge 863 that is straight and preferably longer than the lower lead edge 841 of the lead planar portion 84 and an angled upper lag edge 864 that is parallel to the upper lead edge 842 of the lead planar portion 84. The lag planar portion also extends below the lead planar portion, forming a projection 89, shown in FIG. 8A, for engaging a drive chain.

The solid side plate 80 further includes a fastening mechanism, including a base 91 extending from the inner side of the lead planar portion 84. The base includes openings 92 for screws or another attachment means, as well as a support beam 98.

A separate lower fastening mechanism for the solid side plate 80 fits into an opening of the module and receives the screws that pass through the base 91. The lower fastening mechanism 97 for the side plate, shown in FIG. 5, includes a projection 98 for guiding the upper edge of an inner side plate on a lower tier in the stack. The lower fastening mechanism 97 may be integrally molded with the module, or a separate piece that is attached to the module 14 through any suitable means known in the art. In one embodiment, the lower mechanism is integrally formed with the module and the upper portion of the outer side plate is coupled through a fastening mechanism.

The use of an open outer side plate and a closed inner side plate promotes airflow around a product being conveyed. The solid side plate 80 directs air into the center of the belt.

In another embodiment, one or both of the open side plate 50 and solid side plate 80, or the fastening mechanisms for the side plates, may be integrally molded or otherwise formed with the module or molded directly onto the belt module. For example, the bottom guide tab may be molded directly to the conveyor belt module, and the top portion of the side plate may be added later, using any suitable fastening mechanism, such as screws, bolts, welding, and so on.

The side plates may be removable, to allow repairs to a broken side plate within a stack, or non-removable.

In one embodiment, a side plate may be molded from a different material than the conveyor belt module to maximize strength of the side plate in the vertical direction, while the belt has properties to maximize strength in the beam width direction. For example, belt modules can be acetal, but side plates can be a different material, such as composite plastic or thermoset to make them super strong.

Figure 9:
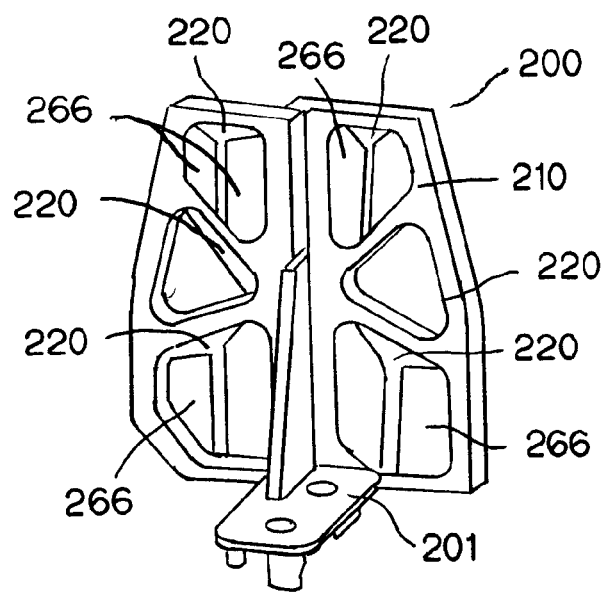
FIG. 9 shows a side plate for a conveyor belt that includes openable and closeable openings.

According to another embodiment of the invention, shown in FIG. 9, a side plate may be openable and closeable to further facilitate airflow. The illustrative self-venting side plate 200 includes a base 201, a planar portion 210, which may comprise a plurality of offset, overlapping planar portions, and openings 220 that may be selectively opened and closed using a valve or other suitable means. The side plate 200 has the ability to open, to allow air to enter the stack, and then close to contain that air while the belt is traveling around other parts of the spiral. The side plate 200 can then re-open on the opposite side of the unit to allow the air to exit the system.

Figure 10:
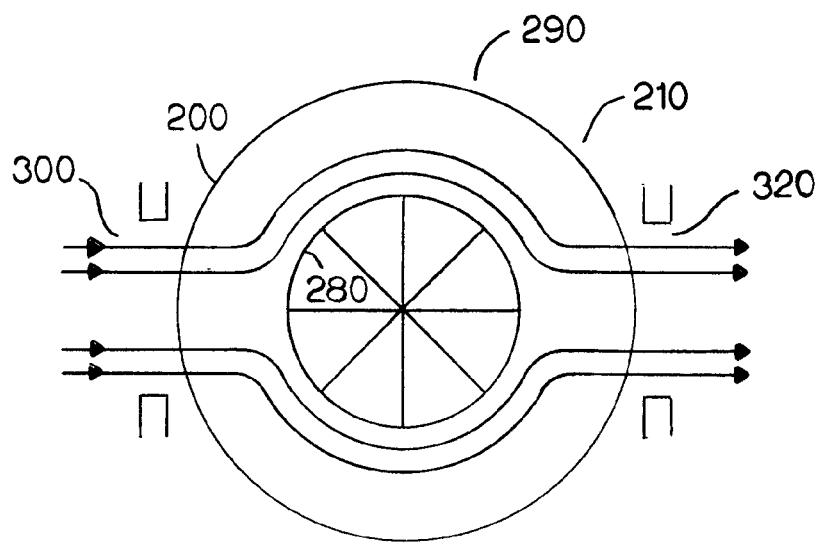
FIG. 10 is a top view showing airflow in a spiral conveyor belt system employing an openable and closeable side plate.

FIG. 10 show the airflow path that a self-venting side plate can achieve. The inner side plate 280 in the center of a spiral 290 is solid, as described above, so little or no air can flow through it. In an air entry zone 300, the outer side plates 200 open to allow air to enter the stack. Once the stack has rotated out of this air entry zone, the outer side plates 200 close and air will be forced to continue around the curved path of the spiral. On the opposite side, in the air exit zone 320, the outer side plates 200 re-open, allowing air to exit the stack and be re-circulated back to cooling coils.

The adjustable side plate 200 can have any suitable configuration. For example, the illustrative side plate 200 includes one or more valves, such as saloon-door type flaps 266, which selectively open and close the openings 220. When the belt is in the air entry zone 300, the flaps can open up to allow air into the system. When the system rotates out of this air entry zone, the flaps close to contain the air. When the system rotates to where the outer side plates are in the air exit zone 320, the flaps reopen to allow for air to exit the stack 290.

Any suitable actuator may be used to open and close the side plate. For example, in one embodiment air pressure may be used. Ducted air can be directed at the side plate in the air entry section, causing the side plate to open up for air entry. In another embodiment, the side plate may be spring loaded to close the side plate in a default position. When the belt rotated out of the air entry zone, the valves may spring closed. On the air exit side, a cam or magnetic system could force the side plate into their open position allowing the air to exit. When the belt rotates out of this section, the openings would then be re-closed.

The conveyor belt may also include other means for improving airflow around a product. For example, the side plates may include baffling to break up laminar airflow and add turbulence to the air.

Figure 11A:
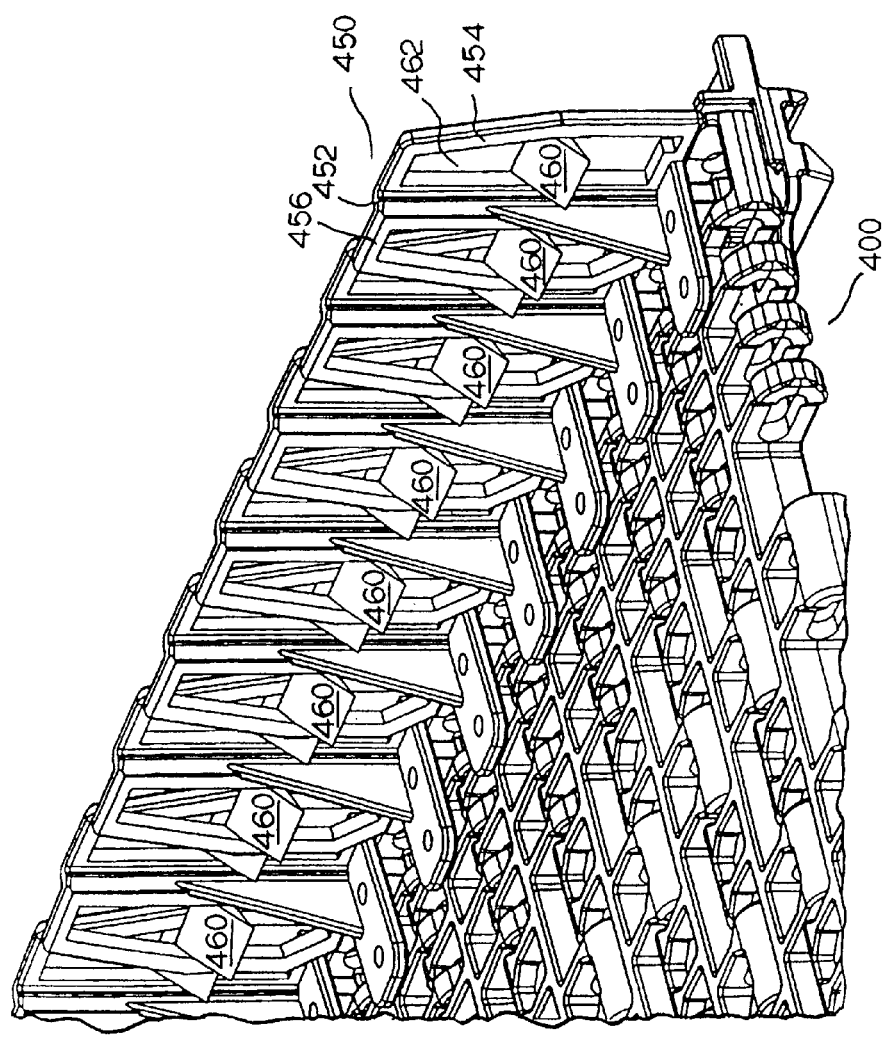
FIG. 11A is an inner view of an outer portion of a conveyor belt including open side plates with air foil members for adding turbulence to the air flowing through the side plates.

The open side plate may include a mechanism for inducing turbulence in air flowing through the side plate, promoting cooling. FIGS. 11A and 11B show a portion of a conveyor belt 400 including an open side plate 450 having an air foil cross member 460 for adding turbulence to the air. The open side plate 450 is coupled to or integral with an outer side edge of a conveyor belt module. The open side plate 450 includes offset, open planar portions 545, 456 and a central spine 452. An air foil cross member 460 extends across the openings 462 in the planar portions to direct air flow through the openings. As indicated by the arrows, the air foil cross member 460 pushes the air down and stirs the air to make it turbulent. Alternatively, the air foil cross member forces the air up to make it turbulent.

In one embodiment, the air foil cross members alternate in orientation, so that one row of the conveyor belt pushes air up, while the next row pushes air down to increase turbulence.

The air foil cross member may have any suitable shape for directing air. Helical shaped structures on the air foil cross members may be added to increase or decrease the turbulence of the air.

The side plates facilitate stacking of the belt in the helical configuration, as each module rests on a side plate on a lower tier. Each side plate may releasable engage a portion of the conveyor belt above it and/or below it. Alternatively, a frame may be used to configure the helix, with the side plates providing additional support or airflow direction.

The side plates 50, 80, may be formed of or include a detectable material. The detectable material enables the side plate to be easily found in case of breakage. In one embodiment, a detection system detects the absence of a side plate in the belt using, for example, x-rays, metal detection or another suitable means, and stops the running of the belt until the missing side plate is replaced, fixed or found. Examples of suitable materials compatible with known detection systems, such as metal detection systems and x-ray detection systems include, but are not limited to the DELRIN FG400MTD BLA079 acetal resin available from E.I. du Pont de Nemours and Company of Wilmington, Del. or the DELRIN FG400XRD N010 acetal resin available from E.I. du Pont de Nemours and Company of Wilmington, Del.

In addition, or alternatively, the side plates 50, 80 and-or the belt modules 14 may be formed of or include a low thermal expansion material. Examples of suitable low thermal expansion material include, but are not limited to injected molded plastics, such as fiber-filled plastics, a polyphenylene sulfides, liquid crystal polymers and others known in the art, as well as a thermoset or non plastic material, such as metal or a carbon fiber-type laminate. An example of a suitable polyphenylene sulfide is TECHTRON 1000 polyphenylene sulfide available from Quadrant AG. An example of a suitable liquid crystal polymer is the XYDAR liquid crystal polymer material available from Solvay Advanced Polymers USA LLC of Alpharetta, Ga. The use of a low thermal expansion plastic material for the side plates 50, 80 mitigates the effects of changes in temperature, by preventing or reducing thermal expansion and contraction as the belt modules move from a warm zone to colder or frozen temperature zones.

According to another embodiment of the invention, a mechanical device for preventing de-stacking of the belt may be used.

Figure 12:
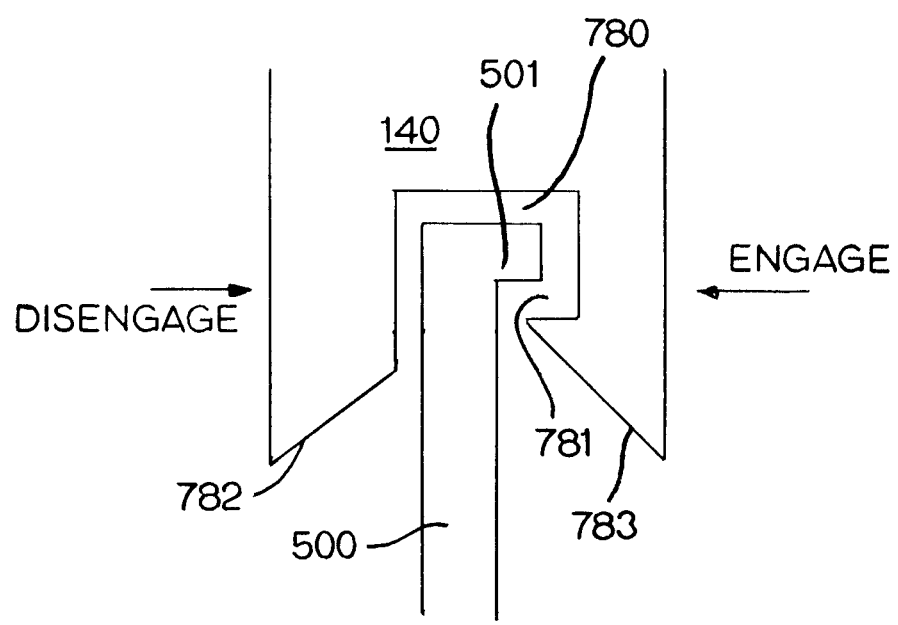
FIG. 12 is a close-up view of a portion of a self-stacking conveyor belt including a locking mechanism for locking two tiers together.

For example, referring to FIG. 12, a side plate 500 may include a locking mechanism for locking stacked tiers together. In the illustrative embodiment, the outer side edge of a belt module 140 includes a recess 780 in a bottom surface for engaging the top of the side plate 500 below. The side plate 500 includes a tab 501 for engaging the recess 780. The illustrative tab 501 extends substantially perpendicular to the body of the side plate 500. The recess 780 includes a main portion and a nook 781 for receiving the leg of the tab 501. The recess 780 also includes tapering side surfaces 782, 783 for guiding the tab into the recess. Engagement of the leg is caused by pushing from a first side of the module, to lock the tab in the nook 781. Disengagement is caused by pushing from the second side of the module to release the tab from the nook 781.

Figure 13:
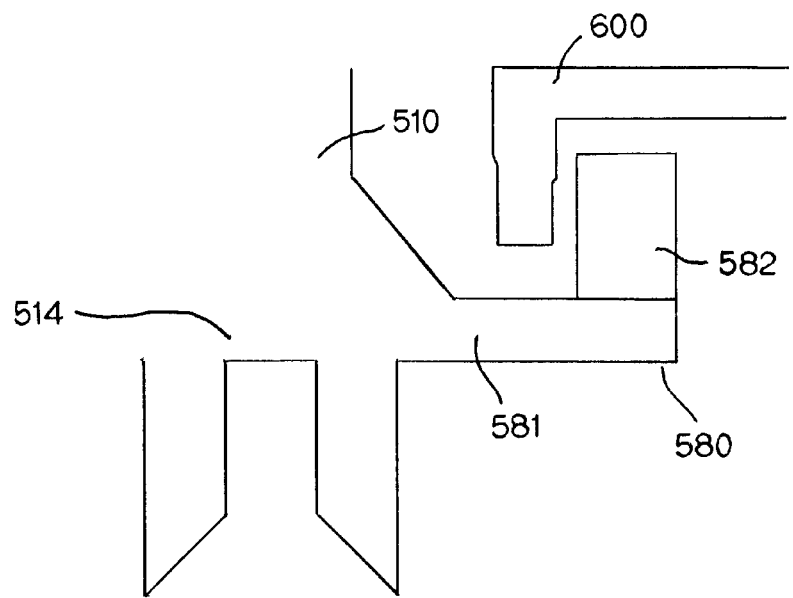
FIG. 13 is a close-up view of a portion of a self-stacking conveyor belt including a hold-down.

In another embodiment of the invention, shown in FIG. 13, the side plate 510 or belt module 514 may include a hold down tab 580 that engages a belt holder 600. The belt holder engages the hold down tab 580 to pull the belt out, preventing de-stacking. The illustrative hold down tab 580 includes a base 581 extending outwards from the module 514 and a leg 582 extending perpendicular to the base 581.

Figure 14:
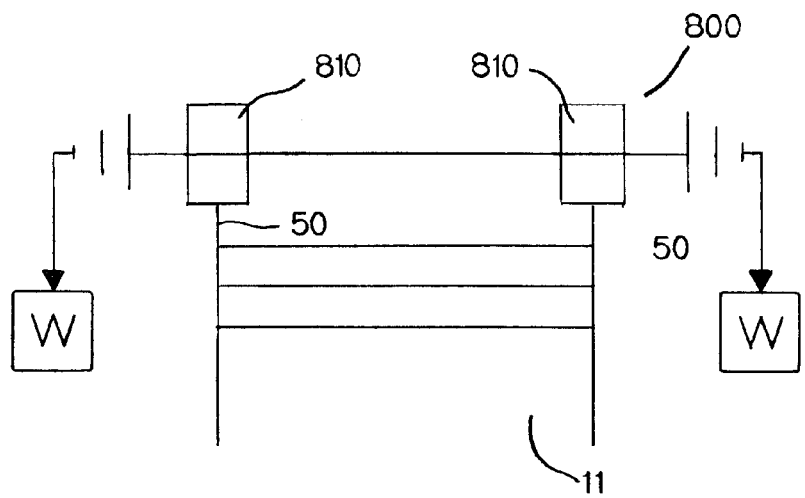
FIG. 14 is a side view of a self-stacking spiral conveyor belt including another type of hold-down.

In another embodiment of the invention, shown in FIG. 14, a hold down 800 may push on the top tier of the stack 11 and create a force to prevent de-stacking of the belt. The hold down may comprise a shoe 810, weight or other device in contact with the top tier of the stack. The hold down applies pressure to the top few tiers of belting to keep them from flipping up or de-stacking. The hold down 800 may press on top of the side plates 50 or on edge tabs connected to the modules.

Figure 15A:
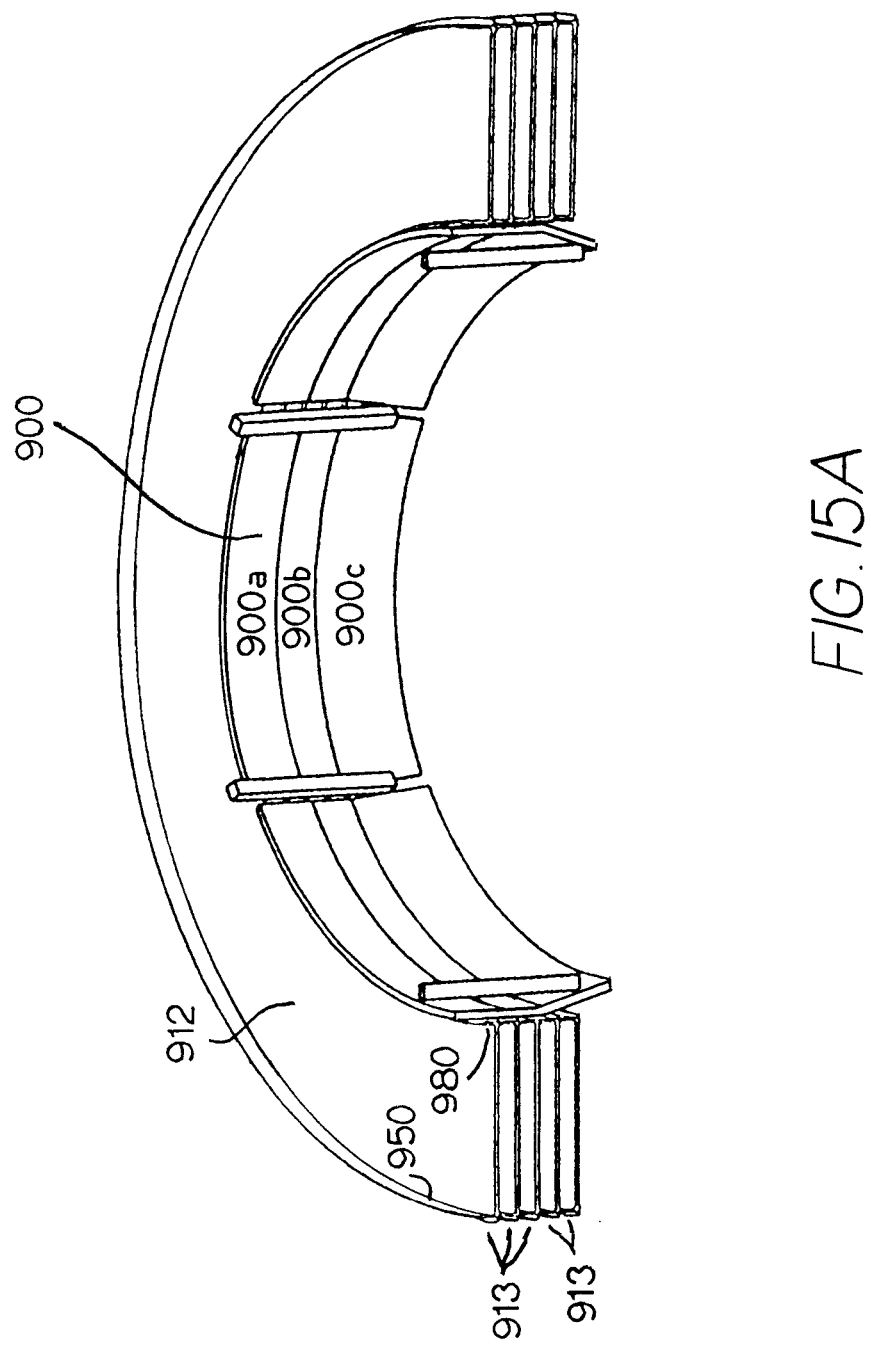
FIG. 15A is a cross-sectional isometric view of a self-stacking spiral conveyor belt including a guide to prevent destacking of the belt.
Figure 15B:
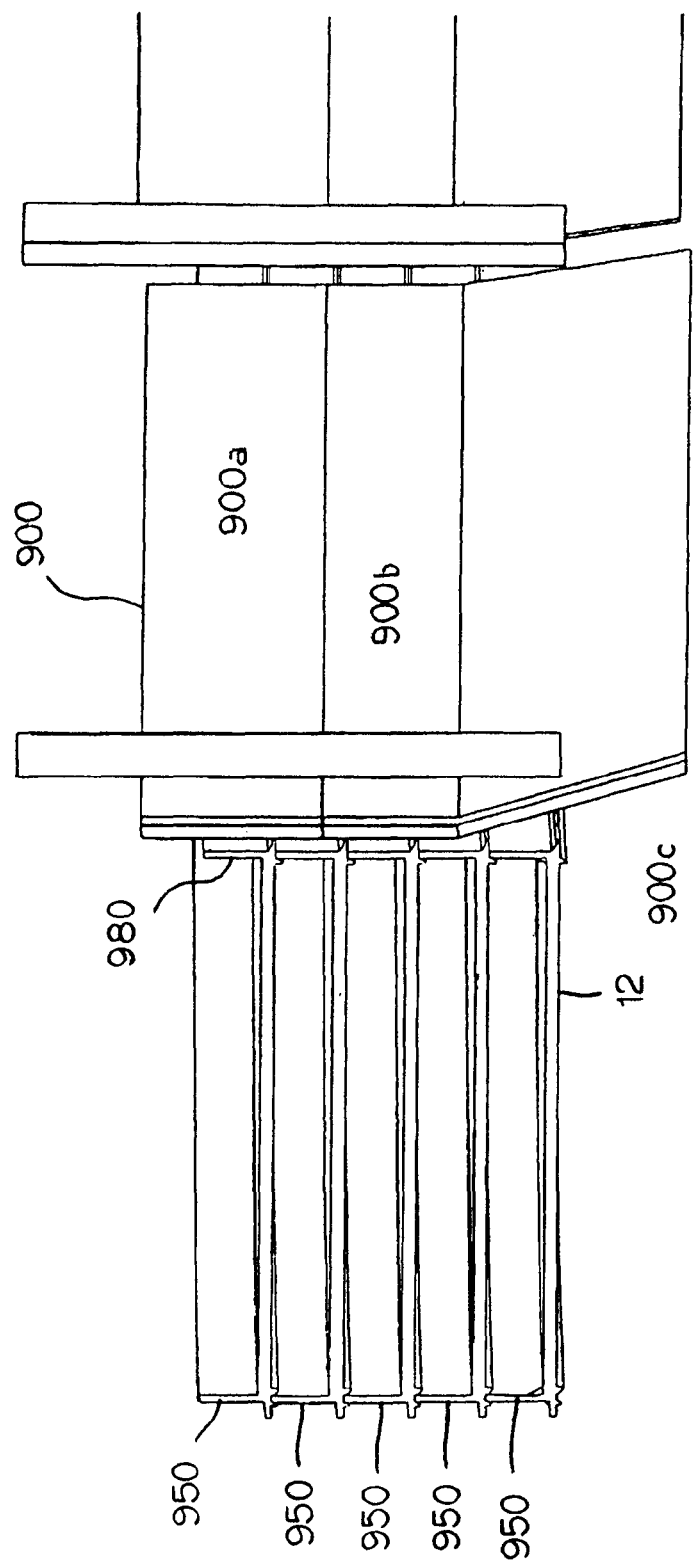
FIG. 15B is a cross-sectional detailed view of the self-stacking spiral conveyor belt including a guide as shown in FIG. 15A.

Referring to FIGS. 15A and 15B, a self-stacking spiral conveyor belt 912 has side plates 950 and 980 and may include a guide, such as a top ring 900, to prevent de-stacking. The illustrative top ring 900 is an inner ring disposed on the inside of the stack to keep the stack stable if the stack starts to lean. The illustrative ring 900 is as tall as several of the tiers 913 of the stack. For example, in an illustrative embodiment, a top portion 900a of the ring is about eight inches in height. A central portion 900b of the ring 900 is between about six and about eight inches in height. The ring 900 tapers at the bottom 900c. As the temperature decreases and the belt gets cold, the belt may tend to shrink. The top ring 900 or other guide stretches the shrunken belt back to the original diameter. The taper at the bottom 900c allows the belt to fully engage the ring. The weight of the belt sitting on top holds the belt down in a horizontal position as it engages the top ring and stretches to the larger diameter.

In one embodiment of the invention, the top ring may be moveable.

Sensors may detect compression of the stack. Feedback from the sensors can be used to move guides in and out to prevent de-stacking.

In another embodiment of the invention, the turn ratio of the belt is matched to that of the first tier. This would keep the belt from collapsing any further when the temperature in the surrounding environment drops.

To prevent or limit destacking, the rate of temperature change may be slowed. Slow cooling of the belt may help limit or prevent destacking.

Although the invention has been described in detail with reference to a few exemplary versions, other versions are possible. The scope of the claims is not meant to be limited to the versions described in detail.

What is claimed is:

1. A conveyor belt module comprising:
   a central portion extending longitudinally from a first end to a second end, laterally from a first side edge to a second side edge and in thickness from a top surface to a bottom surface;
   a first solid side plate coupled to the first side edge for blocking airflow, the first solid side plate comprising two overlapping solid planar portions connected by a central spine, the first solid side plate including a lead edge comprising a first straight lower portion and a first angled upper portion and a lag edge comprising a second straight lower portion and a second angled upper portion that is parallel to the first angled upper portion; and
   a second side plate coupled to the second side edge, the second side plate including at least one opening to allow airflow therethrough.

2. The conveyor belt module of claim 1, further comprising a valve for selectively opening and closing the opening in the second side plate.

3. The conveyor belt module of claim 1, wherein the second side plate further includes an air foil member for adding turbulence to air flowing through the at least one opening.

4. The conveyor belt module of claim 1, further comprising a fastening mechanism for removably coupling the first side plate to the first side edge of the central portion.

5. The conveyor belt module of claim 1, further comprising a fastening mechanism for removably coupling the second side plate to the second side edge of the central portion.

6. The conveyor belt module of claim 1, wherein the second side plate comprises two offset planar portions connected by a central spine, and at least one opening formed in the offset planar portions.

7. The conveyor belt module of claim 1, wherein the first side plate has a length in the longitudinal direction that is less than a length of the second side plate in the longitudinal direction.

8. The conveyor belt module of claim 1, wherein the second side plate includes a longitudinally-extending channel on a bottom surface for receiving an upper edge of a third side plate connected to a second module.

9. The conveyor belt module of claim 1, wherein the first side plate includes a longitudinally-extending projection on a bottom surface for guiding an upper edge of a third side plate connected to a second module.

10. The conveyor belt module of claim 1, wherein the first side plate and second side plate are integrally formed with the central portion.

11. The conveyor belt module of claim 1, wherein the central portion of the module includes a recess in the bottom surface for receiving a top edge of a side plate of another module.

12. The conveyor belt module of claim 11, wherein the first side plate includes a tab at an upper edge thereof for locking into a recess formed in the bottom surface of another module.

13. The conveyor belt module of claim 1, further comprising a hold down tab extending outwards from central portion for engaging a belt holder.

14. The conveyor belt module of claim 13, wherein the hold down tab comprises a base and a leg extending perpendicular to the base.

15. A conveyor belt module comprising:
    a central portion extending longitudinally from a first end to a second end, laterally from a first side edge to a second side edge and in thickness from a top surface to a bottom surface;
    a side plate coupled to the first side edge, the side plate having a body and at least one airflow openings formed in the body; and
    a valve for selectively opening and closing the airflow opening.

16. The conveyor belt module of claim 15, wherein the side plate further includes an air foil member for adding turbulence to air flowing through the at least one opening.

17. A spiral conveyor belt comprising:
    plurality of modules hingedly connected together forming a helix;
    a plurality of solid side plates coupled to an interior portion of the helix for blocking airflow and directing airflow along the path of the conveyor belt; and
    a plurality of open side plates coupled to an exterior portion of the helix, each open side plate having at least one opening to allow airflow therethrough.

18. The spiral conveyor belt of claim 17, wherein a first tier in the helix is supported by a tier of solid side plates and open side plates in a second tier below the first tier.

19. The spiral conveyor belt of claim 17, further comprising a locking mechanism for locking the first tier of the helix to the second tier.

20. The spiral conveyor belt of claim 17, further comprising a hold down tab extending outwards from each module for engaging a belt holder.

21. A conveyor belt comprising a plurality of rows of modules hinged connected together, each row including:
    a solid side plate at a first side of the belt; and
    an open side plate at a second side of the belt, the open side plate having at least one opening to allow air to flow therethrough, the open side plate further includes an air foil member for adding turbulence to air flowing through the at least one opening.

22. A conveyor belt module comprising:
    a central portion extending longitudinally from a first end to a second end, laterally from a first side edge to a second side edge and in thickness from a top surface to a bottom surface;
    a first side plate extending up from the top surface near the first side edge;
    a second side plate extending up from the top surface near the second side edge; and
    a locking mechanism for locking the module to a lower conveyor belt module, the locking mechanism comprising a longitudinally-extending channel in a bottom surface below the first side plate, the longitudinally-extending channel having angled side walls that taper inwards for guiding a top edge of a lower side plate into the longitudinally-extending channel.

23. A spiral conveyor, comprising:
    a self-stacking conveyor belt having a plurality of modules with side plates hingedly connected together to form a helix having a plurality of tiers, wherein the side plates of a first tier contact and support a second tier above the first tier; and
    a ring-shaped guide disposed within the helix and spanning a plurality of tiers in height for preventing destacking of the conveyor belt, wherein the ring-shaped guide includes a bottom taper for guiding the conveyor belt onto the ring-shaped guide.

24. The spiral conveyor of claim 23, further comprising a locking mechanism for locking the first tier to the second tier.

25. The spiral conveyor of claim 23, further comprising a hold down for pressing the second tier onto the first tier.

26. The spiral conveyor of claim 24, wherein each module has a first side plate having a plurality of openings coupled to an outer edge of the module and a second side plate coupled to an inner edge of the module.

27. The spiral conveyor of claim 26, wherein the second side plate is solid.

* * * * *